Aug. 10, 1943.        E. W. FULLER ET AL        2,326,349
            WINDSHIELD WIPER MECHANISM
              Filed March 7, 1941        2 Sheets-Sheet 1
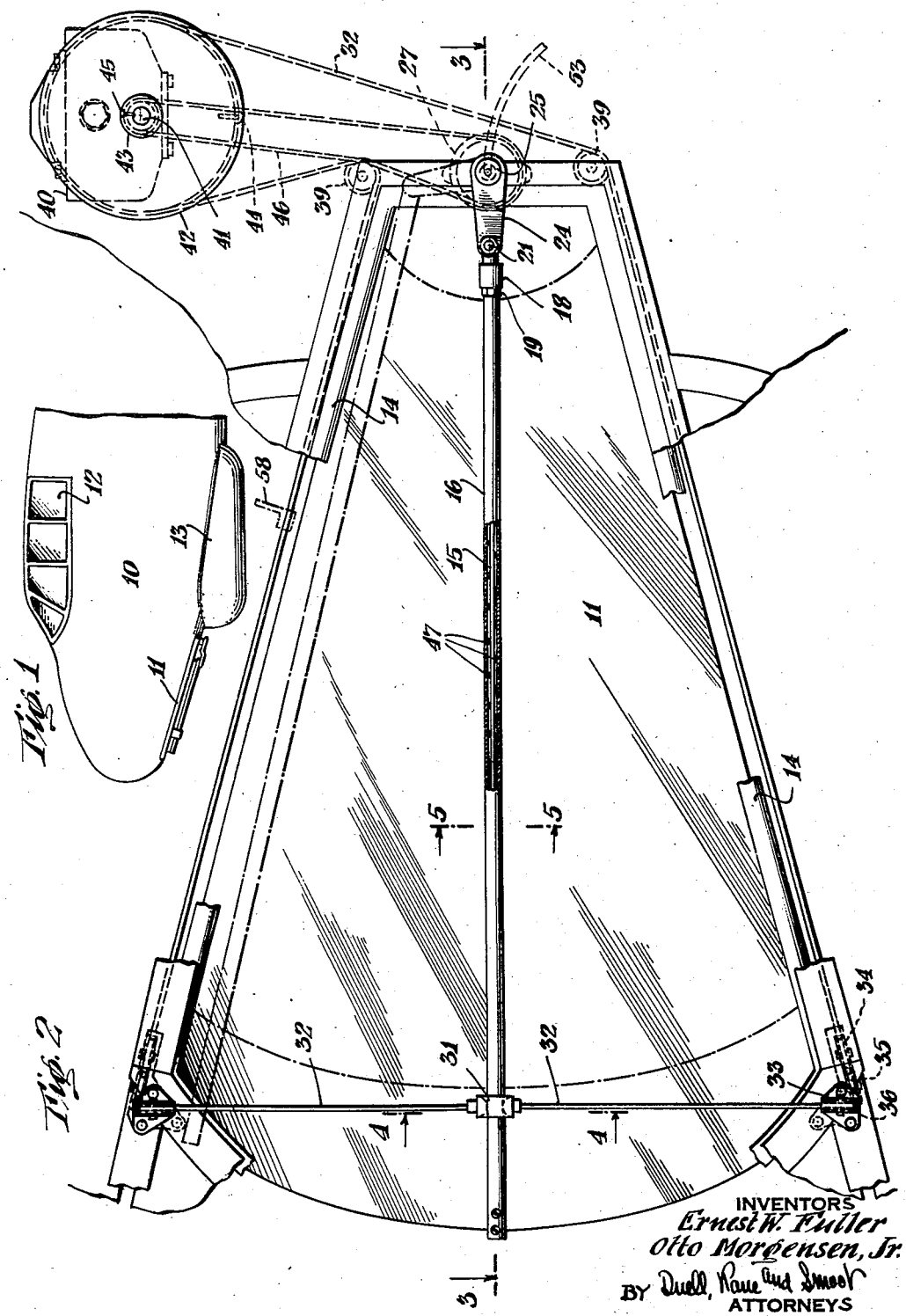
INVENTORS
Ernest W. Fuller
Otto Morgensen, Jr.
BY Duell, Kane and Smoot
ATTORNEYS Aug. 10, 1943.  E. W. FULLER ET AL  2,326,349
WINDSHIELD WIPER MECHANISM
Filed March 7, 1941  2 Sheets-Sheet 2
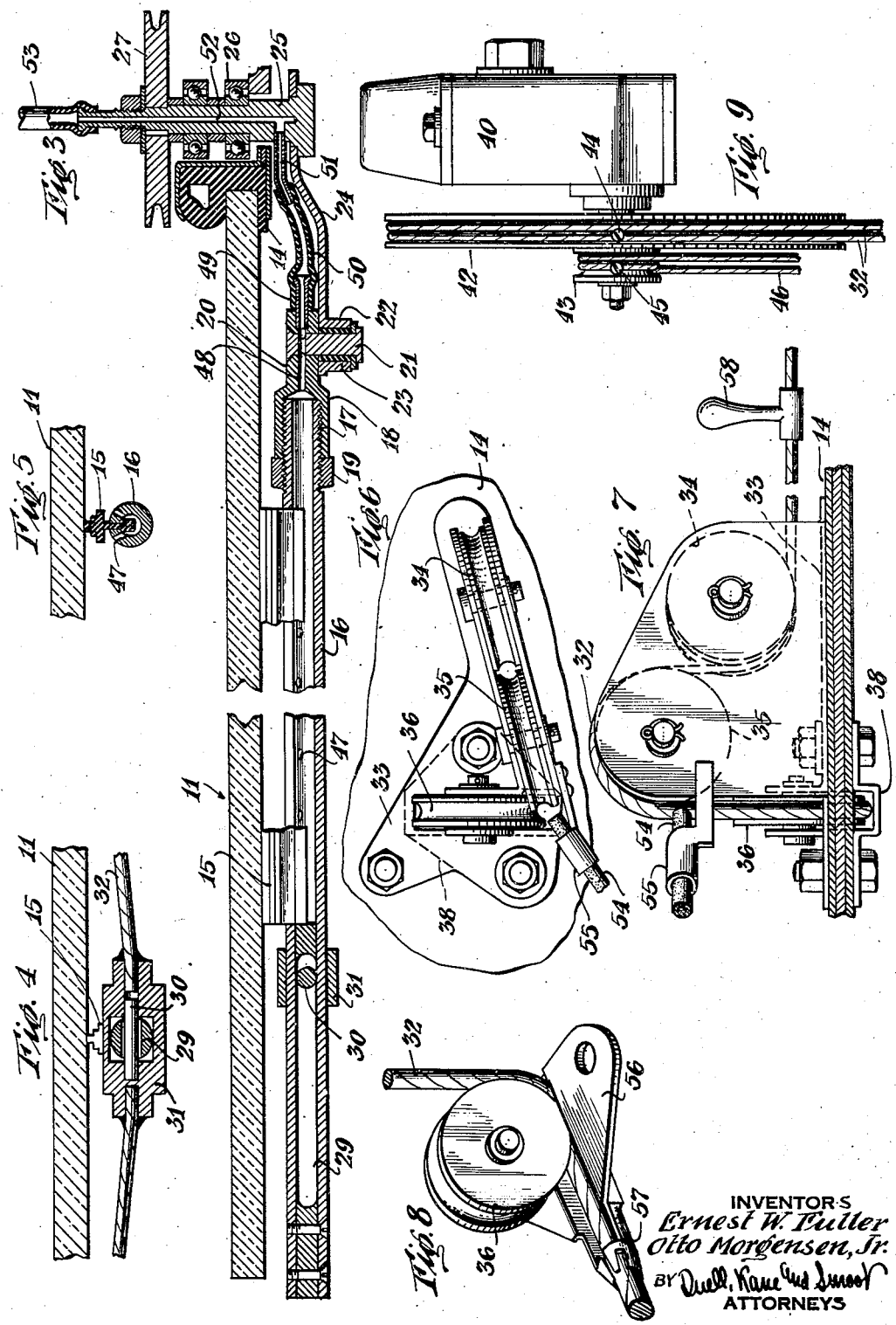
INVENTORS
Ernest W. Fuller
Otto Morgensen, Jr.
BY Duell, Kane and Smoot
ATTORNEYS Patented Aug. 10, 1943

2,326,349

UNITED STATES PATENT OFFICE 2,326,349

WINDSHIELD WIPER MECHANISM

Ernest W. Fuller, Shaker Heights, and Otto Morgensen, Jr., Dayton, Ohio, assignors to The Acrotorque Company, Cleveland, Ohio, a corporation of Connecticut Application March 7, 1941, Serial No. 382,134

17 Claims. (Cl. 15—250.4)

This invention relates to a structurally and functionally improved cleaning apparatus and especially an apparatus which may be employed in association with a vehicle and by means of which a window of the latter may be maintained in clean condition. This application presents the same disclosure as that of the prior application for United States Letters Patent filed December 19, 1940, in the name of Ernest W. Fuller on windshield wiper mechanism and identified under Serial Number 370,764.

In its more specific aspects, the present invention contemplates a cleaning apparatus, especially intended for association with the bombardier window of a bombing type of aeroplane, and which window will be maintained in such visually transparent condition that efficient sighting through the same may be achieved under virtually any weather conditions and where heretofore the accumulation of ice, snow and moisture particles on the window would have prevented proper observation.

It is an object of the invention to furnish an apparatus of this character which may be applied to virtually any type of aeroplane of this general class and which apparatus will involve relatively few parts, each individually simple and rugged in construction, so that a mechanism is furnished which will function over long periods of time with freedom from all difficulties. Also, this mechanism will be of relatively light weight, so that no objections will occur in this connection.

A further object of the invention is that of furnishing a mechanism of this type, which, when in inoperative condition, may be parked or brought to a position of rest in a manner such that it will in no wise interfere with normal vision by the bombardier.

A further object of the invention is that of furnishing a structure of this nature and which will function, despite the most adverse weather conditions, and, moreover, in which it will be possible to initiate operation of the apparatus, even in the event that the operator should fail to start the same at the proper time and thus allow the parts to become blocked with accumulation of ice and other material.

With these and other objects in mind, reference is had to the attached sheets of drawings illustrating practical embodiments of the invention, and in which:

Fig. 1 is a partly fragmentary view of the forward portion of the fuselage of an aeroplane of the bombing type;

Fig. 2 is a bottom plan view of the bombardier's window as indicated in Fig. 1, and showing one form of the mechanism constructed in accordance with the teachings of the present invention as applied thereto;

Fig. 3 is a longitudinal sectional view, taken along the lines 3—3 and in the direction of the arrows as indicated in Fig. 2;

Fig. 4 is a transverse sectional view taken along the lines 4—4 and in the direction of the arrows as indicated in Fig. 2;

Fig. 5 is a similar view taken along the lines 5—5 and in the direction of the arrows as indicated in Fig. 2;

Fig. 6 is a top plan view of a guiding assembly such as preferably forms a part of the present structure;

Fig. 7 is a sectional side view of such assembly;

Fig. 8 is a perspective view of one of the units which may form a part of the assembly; and Fig. 9 is a side elevation of the motor mechanism which may be employed to drive the present apparatus.

As afore brought out, the present invention is primarily intended for use in connection with aircraft and is especially designed for application to the windows which form a part of the skin of the aircraft, and especially windows such as would be employed by a bombardier for sighting and observing the terrain below the areoplane. Accordingly, in the accompanying drawings and the following description, the invention has been described in such association. However, it is to be understood that this is to be taken in an illustrative rather than in a limiting sense—except where otherwise indicated in the claims—in that the subject matter of the present invention will be of utility and value in other associations different from that which has been especially referred to above.

Also, in the following specification, reference will hereinafter be had to a motor mechanism for operating the apparatus. While this motor mechanism may take numerous different forms within the purview of the present invention, it is preferred that this unit embrace structures as are, for example, taught and fully described in the prior applications for united States patent in the name of Elias Orshansky, Jr., filed on May 22, 1940, and October 5, 1940, and respectively entitled "Windshield wiper motor" and "Windshield wiper."

Thus, referring to Fig. 1, it will be seen that the reference numeral 10 indicates the fuselage of an airplane adjacent the nose and under-side of which a window 11 may be provided. Above and to the rear of this window, the pilot compartment 12 may be disposed, and to the rear of the window a "blister" 13 may be provided. In accordance with conventional practice, the bombardier of the plane may be seated to the rear of window 11, and sights through the latter upon a target through the instrumentality of a bombsight of any desired type.

As shown in Fig. 2, window 11 has been illustrated in a conventional and presently accepted outline which includes a relatively narrow rear end portion, outwardly and forward flared side edges, and a relatively long forward edge. This window is mounted in any suitable type of supporting frame 14, which is in turn secured in any desired manner to the skin or frame of the ship.

As illustrated in especially Fig. 5, taken in conjunction with Figs. 2 and 3, the surface of panel 11 is traversed and engaged by a suitable squeegee 15, formed of rubber or any other suitable material. This element is mounted by a tube 16 which may be longitudinally slotted to permit of the insertion therein of the base of the rubber strip, the glass engaging portions which extend beyond the tube. The arm provided by the tube 16 is preferably substantially longer than the length of the strip 15. Such arm projects beyond both the inner and outer ends of such strip.

The inner end of the tube or arm is mounted by being formed with a thread and this end is received in a correspondingly threaded socket 17; the parts being secured against accidental movement, as, for example, by means of a nut 19. The socket is extended in the form of a stem 20, and by means of a pin 21, is rotatably mounted by a collar 22. A bushing 23 of any desired material may be interposed between the pin and collar; such pin being preferably secured against rotation with respect to stem 20.

Collar 22 is attached to or forms a part of a relatively stiff spring 24, the inner end of which is secured against movement with respect to a shaft 25. This shaft may be rotatably supported by anti-friction bearings 26, which are in turn mounted by any suitable structure (not shown). Secured to shaft 25, to rotate the latter, is a driving member which may be in the form of a pulley 27.

The outer end of tube 16, at points beyond blade 15, may be transversely slotted, as indicated by the numeral 29 and as especially shown in Figs. 4 and 6. Mounted for reciprocation within the guideway provided by this slot is a pin 30. The ends of the pin are secured to a block 31 and thus it will be seen that the latter may move longitudinally with respect to the tube, while at the same time its movement will be properly guided.

Having their ends secured to the block 31, in any desired manner, are cables 32, which extend toward the pulley assembly, generally shown in Fig. 2 and illustrated in detail in Figs. 6 and 7. These assemblies may include brackets 33, suitably secured or connected to the frame 14, and which brackets mount a pair of pulleys 34 and 35, as well as a further pulley 36. The periphery of the latter extends in a direction generally transverse the axis of arm 16, and the outer portion of this pulley projects beyond the skin of the ship and at which point it may partially be enclosed in a channel member 38. The peripheries of pulleys 34 and 35 preferably extend in the same general direction and parallel to the side edge portions of the panel 11, adjacent which they are disposed. Cable 32 extends within channel member 38, around pulley 36, then over pulley 35, and under pulley 34, and thence toward the base or rear edge of panel 11.

At the latter point, pulleys 39 are provided. If the motor generally indicated at 40 is disposed to one side of the window 11, the axes of pulleys 39 will be in a vertical direction. The motor 40 may be of any desired construction, but preferably follows the teaching embodied in the aforementioned United States applications of Orshansky. This is excepting only that the rackbar and pinion assembly may be modified, for example, in a manner such that for each complete stroke of the rack-bar, the pinion and shaft 41, extending from the motor, and carrying pulleys 42 and 43, causes rotation of the latter throughout either a full circle or substantially a full circle.

Cable 32 passes around pulley 42, and relative movements of these parts is prevented, as, for example, by an anchoring element 44. It follows as consequence of this construction and as the motor operates, cable 32 will be alternately projected and retracted. According to the present invention, the distance travelled by any cable-supporting point of pulley 42 is substantially equal to the arc to be traversed by arm 16 and adjacent the point of connection of the block 31 therewith. Accordingly, with such reciprocation of the cable 32, the outer end of the arm is caused to sweep across panel 11 from a point immediately adjacent one side edge thereof through to the opposite side of the same.

To connect the pulley 43 to the shaft 25 is a cable 46. This cable passes around and is secured against movement with respect to driving pulley 27. The proportion or relative areas of pulleys 43 and 27 is such that with the latter oscillation throughout substantially a complete circle, pulley 27 is caused to oscillate through an arc of substantially 160 degrees. As afore brought out, spring 24 is secured to shaft 25, and this spring provides at its outer end a mounting which supports the inner end of wiper arm 16. Accordingly, under such operation of the parts, the inner end of this arm will be oscillated through a corresponding arc.

It follows as a result of this construction that arm 16 and blade 15 not alone sweep over the surface of panel 11, but also that blade 15 reciprocates, within limits, along to its longitudinal axis. Consequently, a sweeping stroke is produced, such that the blade moves over the panel with minimum effort and power requirements and also clears the panel surface from all the particles adhering thereto in a manner such that clear vision through the panel may be preserved. In other words, a "shearing" effect is achieved and such effect contributes to a maximum extent to efficiency in removing all particles of moisture, ice, snow or other foreign matter from the surface of panel 11.

Additionally, as a result of this construction, it is feasible, with the wiper arm in inoperative condition, to maintain or "park" the blade adjacent the extreme side edge of panel 11 so that there will be no interference to vision through such panel. In other words, a control (not shown) is associated with motor 40, and if it is desired to interrupt the operation of the wiper mechanism, the control is manipulated so that this will occur when the plane and wiper arm are in the position desired. Such position, will obviously be established when spring 24, or its equivalent has reached its extreme of travel and a similar condition exists on the part of the unit connecting the outer ends of the cable with the arm 16.

As will also be appreciated, an efficient wiping contact between the blade 15 and the surface of panel 11 is at all times assured by virtue of the resilient mounting of the former, and by means of which it is constantly maintained in contact with the surface of the panel or window. In this connection, it will be appreciated that adjacent to the inner end of the base, the spring 24 provides such a form of mounting, while adjacent to its outer end the block 31 is coupled to those portions of cable 32 which extend toward the periphery of pulley 36. Consequently, a "bow-spring" effect is produced which constantly tends to draw the blade into proper and intimate contact with the surface of the panel adjacent this point. At the same time, it will be understood that as the arm or tube 16 is oscillated, the block 31 will reciprocate with respect to this tube, so that no binding or undue tensioning effect will be produced.

In a construction of this nature, it will be appreciated that it might be desirable to distribute fluid toward the surface of the windshield and adjacent to the zone of contact of the squeegee blade therewith. While this fluid might in certain instances take the form of heated air or gases, it will ordinarily be alcohol or some other liquid having anti-freeze characteristics. The present invention contemplates the distribution of fluid in this manner, as for example, by introducing such fluid into the bore of tube 16. As will be seen, this bore may communicate with the outer atmosphere by means of a series of apertures 47, extending through the wall of the tube 16 and to each side of the blade 15. These apertures may be graduated so as to be of increasing size, toward the outer end of the tube.

At its inner end, the bore of the tube has communication with a duct 48 formed in stem 20. Pin 21 is drilled so that this duct is continued, and, as has been afore brought out, this pin is preferably fixed with respect to stem 20, so that no difficulties will be encountered in this connection. The outer end of the stem may mount a nipple member 49, to which a flexible tube 50 may be coupled. A similar member 51 may be coupled to shaft 25 and connect with a bore 52, formed in the latter. A tube 53 may in turn be connected to the outer end of this bore and have connection with a suitable source of fluid (not shown). In this manner, it is obvious that fluid may be distributed in the manner stated and this fluid will be directed toward the surface of window 11 and be distributed across the same by the action of wiper blade 15, thus preventing the formation of any ice "skin" or other film upon the surface of this panel and maintaining the same fully transparent.

Under severe weather conditions, those portions of the cable 32, which extend between the block 31 and pulley assembly, might become coated with moisture or ice particles, and these would be drawn into the mechanism, as the cables are alternately projected and retracted. In order to prevent such an occurrence, at least the housing or channel 38, for the outermost pulley 36 of the assembly, may be packed with a low-temperature-resistant grease. This substance will obviously act to prevent the entrance of the foreign particles or moisture into the interior of the pulley assembly.

Also to prevent the entrance of moisture or ice particles, an anti-freeze substance may be employed. Such anti-freeze substance may be in the form of a liquid, such as alcohol, and may be distributed as shown in Figs. 6 and 7, by employing, for example, a wick 54, extending from a tube and bracket assembly 55, and connecting with a source of anti-freeze liquid (not shown). A further structure which may be employed as a substitute or as a supplemental expedient in this connection, has been illustrated in Fig. 8, in which the housing, or channel portion 56, for the pulley 36, is extended exteriorly at the skin of the ship in the form of a tube 57, which may have its outer end split and its adjacent edge portion bevelled. In this manner, a shearing or scraping edge is provided, which closely embraces the cable 32 and causes the removal from the same of any adhering particles, as the cable retracts within the tube portion 57.

While it will ordinarily be assumed that the bombardier or pilot will initiate an operation of the mechanism the instant weather conditions are such as to warrant such action, it may sometimes occur that, through inadvertence, such initiation of operation may be delayed. Of course, once such operation has been instituted, then no difficulty will be experienced incident to the blade or its associated parts becoming frozen to neighboring portions of the mechanism, and the continued operation of the latter will prevent such an occurrence. However, where initiation of operation is delayed, it may be that the power of the motor 40 would be inadequate to free those portions of the mechanism which have become frozen to adjacent portions. Under these circumstances, some auxiliary structure which would assist in the initiation of operation would be of value. With this thought in mind, the present invention contemplates associating with the mechanism an auxiliary structure which may take the form of manually operable handles 58, secured one to each of the cables 32 at points between the pulleys 34 and pulleys 39. It is obvious that with such a structure, the bombardier or operator will be enabled by striking against the handles to cause relative movement to be effected on the part of the cables and the pulleys, and more particularly force the blade 15 to move with respect to the surface of window 11. When such movement once commences, it is, of course, obvious that the parts have been freed and further manual effort may be waived. Thereafter, with the mechanism operating, it will increasingly tend to free the parts from any accumulation of ice and snow which has heretofore occurred. This will be especially true if alcohol or any other suitable fluid is distributed at points adjacent to the wiper blade as contemplated by the present invention.

From the foregoing, it will be appreciated that while the present apparatus may be employed in numerous different associations, it will be of very great value when utilized in connection with aircraft and especially where it serves to clear the observation window for the bombardier. As will be apparent, a maximum of power is transmitted through to the mechanism and especially the blade, and the latter will be at all times maintained in intimate cleaning contact with the surface of the window panel.

The mechanism will obviously be of light weight and free from any probability to failure. Also, it may be applied with the expenditure of a minimum amount of effort and time to virtually any given installation, and if the necessity of servicing arises, this may also be readily attended to.

Thus, it will be apparent that among others, the objects of the invention as especially aforementioned, are achieved. Obviously, numerous changes in construction and re-arrangement of the parts of the mechanism might be resorted to without departing from the spirit of the invention as defined by the claims.

We claim:

1. In combination, a blade receiving arm disposable exteriorly of a surface to be cleaned, driving means slidably connected to said arm for causing sidewise movement of the same, means disposable adjacent the side edges of such surface and connected to said last-named means for driving the same, and means for pivotally mounting said arm.

2. In combination, a blade receiving arm disposable exteriorly of a surface to be cleaned, driving means slidably connected to said arm for causing sidewise movement of the same, means disposable adjacent the side edges of such surface and connected to said last-named means for driving the same, and means connected to one end of said arm for imparting limited sidewise movements to the same synchronized with the sidewise movements thereof caused by said driving means.

3. In combination, a blade receiving arm disposable exteriorly of a surface to be cleaned, driving means slidably connected to said arm for causing sidewise movement of the same, means disposable adjacent the side edges of such surface and connected to said last-named means for driving the same, and means connected to one end of said arm for imparting arcuate and reciprocating movement to the same.

4. In combination, a blade receiving arm disposable exteriorly of a surface to be cleaned, driving means slidably connected to said arm for causing sidewise movement of the same, means disposable adjacent the side edges of such surface and connected to said last-named means for driving the same, means connected to one end of said arm for imparting arcuate and reciprocating movements to the same, and means whereby said arm is constantly urged in the direction of the surface to be cleaned and during the sidewise movements of said arm.

5. In combination, a blade receiving arm disposable exteriorly of a surface to be cleaned, driving means slidably connected to said arm for causing sidewise movement of the same, means disposable adjacent the side edges of such surface and connected to said last-named means for driving the same, means for pivotally mounting the arm, and means associated with said arm for distributing fluid in the direction of said surface.

6. In combination, a blade receiving arm disposable exteriorly of a surface to be cleaned, driving means slidably connected to said arm for causing sidewise movement of the same, means disposable adjacent the side edges of such surface and connected to said last-named means for driving the same, means for pivotally mounting the arm, and said arm presenting a bore, and being formed with fluid distributing openings extending from said bore in the direction of the surface to be cleaned.

7. An apparatus of the character described, including in combination an arm to traverse a surface to be cleaned, flexible members having their ends connected to said arm to cause sidewise movement of the latter, means for supporting and guiding said members, a motor means connected to said members for shifting the same, means for supporting said arm adjacent to its opposite end and whereby the arm may be longitudinally shifted, and further means connecting said last-named means with said motor for longitudinally shifting said arm.

8. An apparatus of the character described, including in combination an arm to traverse a surface to be cleaned, flexible members having their ends connected to said arm to cause sidewise movement of the latter, means for supporting and guiding said members, a motor means connected to said members, means for supporting said arm adjacent to its opposite end and whereby the arm will be pivotally mounted and may be longitudinally shifted, means forming a part of said pivotal supporting means for constantly urging said arm towards the surface to be cleaned, and means for connecting said last-named means with said motor for longitudinally shifting said arm.

9. An apparatus of the character described, including in combination an arm to be moved in a sidewise direction, a flexible member connected to said arm to cause such movement, a guide for such flexible member and means associated with said guide for preventing the movement of foreign material adhering to said flexible member to a point beyond said guide.

10. An apparatus of the character described, including in combination a blade-mounting arm, means adjacent one end of said arm for pivotally supporting the same, power driven means extending adjacent the opposite end of the arm and adapted to reciprocate in a substantially straight path and means slidably connecting said last named means with said arm to cause an oscillation of the latter.

11. An apparatus of the character described, including in combination a blade-mounting arm, means adjacent one end of said arm for pivotally supporting the same, power driven means connected adjacent the opposite end of said arm for oscillating the latter and power driven means also connected to said arm adjacent its point of pivotal support for moving such arm.

12. An apparatus of the character described, including in combination a blade-mounting arm, means adjacent one end of said arm for pivotally supporting the same, power driven means connected adjacent the opposite end of said arm for oscillating the latter and means forming a part of said pivotal connection for the arm and whereby said arm may be shifted in a direction longitudinally of its axis.

13. An apparatus of the character described, including in combination a blade-mounting arm, means adjacent one end of said arm for pivotally supporting the same, power driven means connected adjacent the opposite end of said arm for oscillating the latter, means forming a part of said pivotal connection for the arm and whereby said arm may be shifted in a direction longitudinally of its axis and further power driven means coupled to said last named means for effecting such shifting.

14. An apparatus of the character described, including in combination a blade-mounting arm, means adjacent one end of said arm for pivotally supporting the same, power driven means connected adjacent the opposite end of said arm for oscillating the latter, said arm being tubular and being formed with perforations for the distribution of liquid.

15. An apparatus of the character described, including in combination a blade-mounting arm, means adjacent one end of said arm for pivotally supporting the same, power driven means connected adjacent the opposite end of said arm for oscillating the latter, said arm being tubular and being formed with perforations for the distribution of liquid and means defining a passage for said liquid and extending in line with said pivotal connection and connected to the bore of said tubular arm.

16. A windshield wiper mechanism including in combination an arm to traverse the surface of a panel to be cleaned, means mounting said arm and adapted to oscillate one end of the same and simultaneously shift said arm in a direction longitudinally of its axis, and means spaced from said last named means and adapted to act in directions transverse to the axis of said arm for imparting to the latter merely an oscillating movement.

17. A windshield wiper mechanism including in combination a rotatable shaft, a crank secured to said shaft, an arm pivotally coupled to the end of said crank, motor means for rotating said shaft and whereby to impart to said arm a swinging movement and a movement in a direction longitudinally of its axis, and further means also connecting said motor means with said arm and adapted to impart to the latter at a point spaced from said crank, movements in directions transverse to the axis of said arm.

ERNEST W. FULLER.
OTTO MORGENSEN, Jr.